United States Patent [19]

Ryan

[11] 4,267,039
[45] May 12, 1981

[54] FLUID FILTRATION METHOD AND APPARATUS

[75] Inventor: Leo F. Ryan, Bridgewater, N.J.

[73] Assignee: Ecodyne Corporation, Lincolnshire, Ill.

[21] Appl. No.: 98,522

[22] Filed: Nov. 29, 1979

Related U.S. Application Data

[63] Continuation of Ser. No. 857,504, Dec. 5, 1977, abandoned.

[51] Int. Cl.³ .............................................. B01D 37/00
[52] U.S. Cl. .................................... 210/767; 210/193; 210/323.2
[58] Field of Search ............... 210/483, 497, 485, 437, 210/455, 457, 458, 320, 323 T, 75, 193, 169, 322, 330, 340, 343, 347; 55/482, 484, 498, 337; 166/228

[56] References Cited

U.S. PATENT DOCUMENTS

| | | | |
|---|---|---|---|
| 2,028,520 | 1/1936 | Phillips | 210/165 |
| 2,435,510 | 2/1948 | Rabjohn | 210/131 |
| 2,600,458 | 6/1952 | Ackley et al. | 210/323 |
| 2,772,786 | 12/1956 | Gardes | 210/323 |
| 2,796,939 | 6/1957 | Woodruff | 166/228 |
| 3,253,714 | 5/1966 | Quinlan et al. | 210/333 |
| 3,319,793 | 5/1967 | Miller, Jr. et al. | 210/456 |
| 3,369,665 | 2/1968 | Paulson | 210/456 |
| 3,438,502 | 4/1969 | Schmidt, Jr. et al. | 210/232 |
| 3,674,650 | 7/1972 | Fine | 210/323 |
| 3,675,777 | 7/1972 | Heskett et al. | 210/232 |
| 3,747,762 | 7/1973 | White | 210/169 |
| 3,774,771 | 12/1974 | Manjikian et al. | 210/456 |
| 3,847,577 | 11/1974 | Hansen | 55/385 |
| 3,855,127 | 12/1974 | Nakajima et al. | 210/456 |
| 3,857,688 | 12/1974 | Wisniewski | 55/484 |
| 3,931,011 | 1/1976 | Richard et al. | 210/456 |
| 3,948,775 | 4/1976 | Otani | 210/264 |
| 4,007,301 | 2/1977 | De Martino | 210/193 |
| 4,043,917 | 8/1977 | Rowley et al. | 210/323 T |

Primary Examiner—Theodore A. Granger
Attorney, Agent, or Firm—Hume, Clement, Brinks, Willian & Olds, Ltd.

[57] ABSTRACT

A filter element including a perforated tubular member for supporting a filter medium, a tubular distributor core concentrically located within the support member and having a plurality of apertures in the core wall, and a plurality of dividers positioned around the tubular distributor core to prevent the unimpeded flow of liquid through the annular space between the support member and the distributor core and to provide a plurality of annular chambers between the core and the support member. The dividers are located so that the ratio of the flow of liquid through the apertures into an annular chamber to the area of the support member served by the annular chamber is the same for all chambers. In an alternative embodiment the diameter of the apertures is varied along the length of the filter element to assist in distributing the flow of liquid.

10 Claims, 4 Drawing Figures

FLUID FILTRATION METHOD AND APPARATUS

This is a continuation of application Ser. No. 857,504 filed Dec. 5, 1977, now abandoned.

BACKGROUND OF THE INVENTION

The invention relates to a filter element for use in a unit to filter and purify liquids. In particular, the invention is directed to a filter element used in a purification unit wherein a layer of finely divided particles of a suitable filter medium is precoated upon several tubular filter elements, housed within a tank such as that shown and disclosed in Ryan U.S. Pat. No. 3,373,104 which is assigned to the assignee of this application. The medium of finely divided particles deposited upon the filter element serves one or both of the following functions: first, to reduce the content of undissolved solids, such as heavy metal oxide, colloidal matter, and silt, with an efficiency of greater than 90%; and second, to reduce the level of dissolved impurities, such as dissolved salts, from an influent level of greater than 50 ppb (parts per billion) to less than 10 ppb.

It is known that in order to provide efficient and effective removal of dissolved and undissolved impurities by means of such a purification unit, uniform distribution of precoat and subsequent uniform distribution of influent liquid over the length of the precoated tubular filter element is desirable. Furthermore, in order to achieve uniform and complete backwashing of the precoat from the filter element after a service cycle termination point has been reached, uniform distribution of backwash liquid along the length of the tubular element is also essential. In both the service and backwash cycle directions, the liquid tends to avoid distribution by seeking a path offering the lowest pressure drop. Therefore, flow into or out of the element is normally greater near its discharge end. The use of relatively long tubular filter elements having a length of approximately 60 inches and greater with a diameter of approximately 2 inches increases the problem encountered in distributing both service cycle influent and backwash liquid uniformly over the length of the tubular filter elements.

Previously known apparatus have been devised to distribute not only both a filter precoat and an influent liquid but also a backwash liquid along the length of a filter element. Once such tubular filter element with a distributor core is disclosed in Quinlan U.S. Pat. No. 3,253,714. The distributor element disclosed in Quinlan is a centrally-located tube having a plurality of liquid-passage holes or apertures distributed over its wall. The total cross-sectional area of all of these holes is significantly less than the cross-sectional area of the interior of the central tube transverse to its axis. The ratio of these cross-sectional areas taught in Quinlan is that the total of the cross-sectional area of all of the liquid passages holes in the central tube should be about two-thirds of the tube's interior transverse cross-sectional area, and can vary from about one-third to about eight-tenths of that area. These ratios have proved to be inefficient in distributing liquid along the tubular filter elements having a high length-to-diameter ratio. For a tube having a diameter of one inch or less, the relatively large pressure loss effects of elevation differences along the filter element and friction due to flow in the central tube cause difficulties in obtaining even distribution.

Furthermore, tubular filter elements of the prior art have generally includes an unobstructed annular passage zone between the central distributor tube and a filter medium retaining means. This unobstructed annular zone extending for the length of the filter element has allowed liquids to continue to seek the portion of the filter element having the lowest pressure drop along its length both during the service and backwash cycles. Such an unobstructed annular passageway continues the shortcomings of non-uniform deposition of filter precoat over the entire length of the tubular filter element, non-uniform exhaustion of the dissolved and undissolved solids-removal capacity of the filter precoat along the length of the tubular element, and inefficient removal of the filter precoat during backwash, particularly near the uppermost end of the tubular filter element.

When circular seals have been provided around the central tubes, as in Woodruff U.S. Pat. No. 2,796,939, an annular space between the central tube and an outer screen has been filled with a filter medium, such as gravel. This volume of gravel restricts the unimpeded distribution of backwash liquid throughout the annular chamber formed between adjacent circular seals. Also, the gravel filter medium is close to apertures in the central tube so that backwash liquid cleans only the area of the filter medium close to the apertures. Circular seals in the prior art also have the disadvantage of being positioned at equal distances along the length of the filter element, thereby requiring relatively high velocities of backwash liquid and small apertures in the distributor core, which are prone to plugging and difficult to form inexpensively, to provide the high pressure drops needed to accomplish uniform distribution along the length of the filter element.

SUMMARY OF THE INVENTION

According to the present invention there is provided a tubular filter element which overcomes the disadvantages of the prior art by more effectively producing distribution of liquid throughout the length of the tubular filter element during precoating, service, and backwashing operations. The present invention recognizes that the effective distribution of liquid along the entire length of the tubular filter element is accomplished not only by creating annular chambers to prevent the unimpeded flow of liquid along the length of the annular volume between a distributor core and an outer support member, but also by defining the length of the annular chambers in direct proportion to the decreasing flow rates typically existing along the length of the distributor core.

In a preferred embodiment of the present invention, the filter element is adapted to be vertically disposed and includes a perforated tubular support member for supporting a filter medium, and a tubular distributor core, concentrically located within the support member to define an annular space between the support member and the distributor core, having a plurality of apertures in the wall of the core. The tubular core has a plurality of dividers positioned axially along the distributor core within the annular space to prevent the unimpeded flow of liquid through the annular space. The dividers are spaced to define a plurality of annular chambers of decreasing size upwardly along the element, the size of the chambers being such that the ratio of the flow of liquid through the apertures into an annular chamber to the area of the support member served by the annular chamber is the same for all chambers.

In the prior art apparatus, liquid flow was unevenly distributed along the length of the filter element because the liquid was free to seek the lowest pressure drop portion of the filter element, typically near the discharge end as defined in the service cycle direction. According to the present invention, there is provided a number of separate annular chambers to prevent liquid from freely flowing through the full length of the annular space between the central core and the filter medium retention means. The liquid is therefore prevented from passing directly to the portion of the entire filter element having the lowest pressure drop in the prior art apparatus. The chambers of the present invention are designed so that the ratio of the flow of liquid into each chamber to the area of the support member served by the annular chamber is a constant along the length of the filter element. It is therefore not necessary to use relatively high liquid velocities through the holes in the central core in order to create sufficient pressure drops whereby differences in flow of liquid along the filter element become significant.

Elimination of high pressure drop and velocities through the distributor core yields a number of advantages. First, the flow resistance of the entire filter element is lowered, thereby allowing the design pressure for precoat and backwash operations to be reduced. The extent of this advantage will be determined by the degree to which pressure-drops and velocities contribute to the overall flow resistance of the filter element and the system in which the filter element is used. Second, accomplishing uniform distribution without the use of high pressure drops across the filter element avoids the necessity of small holes in the distributor core to accomplish these pressure drops. These small holes have proved to be rather expensive to form and may themselves be prone to plugging with undissolved solids. Third, reducing the required velocity through apertures in the central distributor core results in more uniform backwashing. With small core apertures and high flow velocities as in the prior art, a greater portion of the energy of the backwash liquid passing through an aperture in the core was directed to the area of the filter medium retaining means close to each aperture.

The evenly distributed flow during precoating provides a precoat layer of constant thickness, thereby reducing the possibility of premature fouling due to lodging of particles in filter areas with less precoat. During service cycle operation the evenly distributed flow maximizes precoat area utilization by preventing accelerated exhaustion of the filter precoat near the discharge point. This is especially important when the precoat performs an ion exchange function. Even distribution during backwashing operations assures efficient removal of exhausted precoat, thereby producing uniform cleaning of the tubular filter element and uniformity of subsequent precoat placed on the element. Other advantages, objects, and features of the present invention will become apparent upon reading the following detailed description of the preferred embodiment in conjunction with the accompanying drawings, which are schematic representations, and are not drawn to scale.

DESCRIPTION OF THE PREFERRED EMBODIMENT

Figure 1:
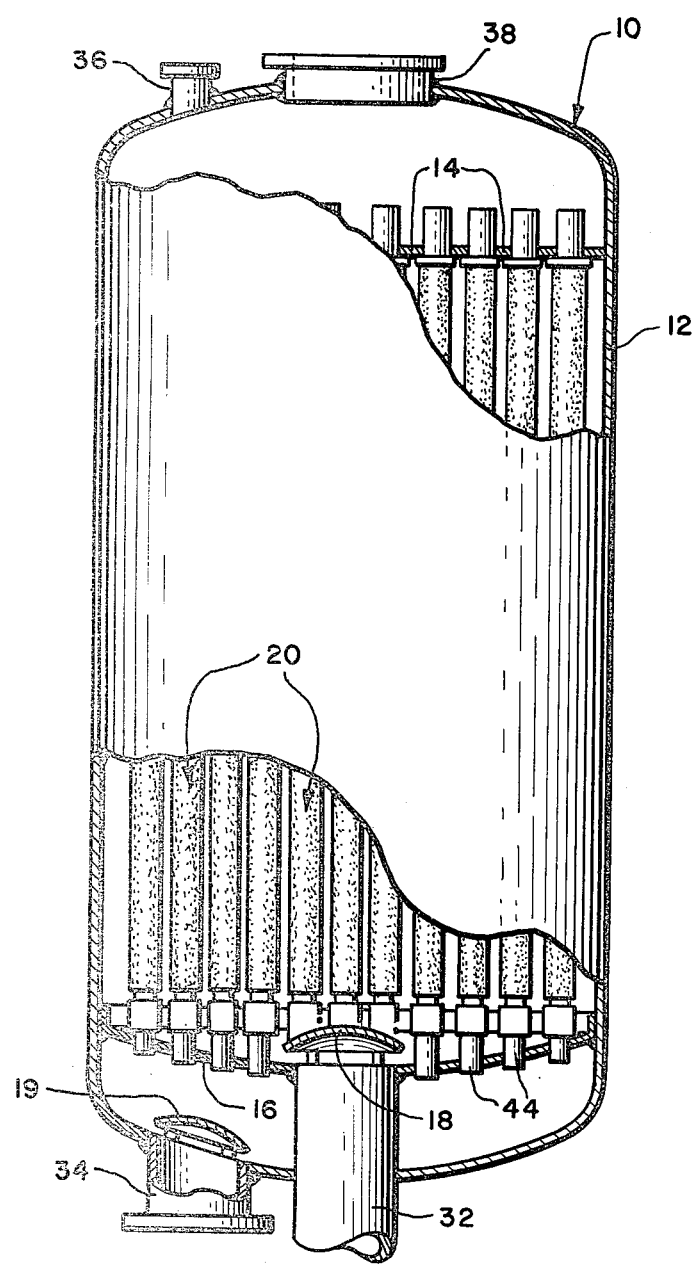
FIG. 1 is a partially cutaway side view of a water purification unit including tubular filter elements according to the present invention.

Referring now to the drawings, and more particularly to FIG. 1, there is illustrated a purification unit, indicated generally by the reference numeral 10, including filter elements 20 embodying the present invention. The purification unit 10 is of the type generally disclosed in Ryan U.S. Pat. No. 3,373,104, incorporated by reference herein. However, the filter elements 20 differ from those disclosed in the Ryan patent by including the features according to the present invention.

The purification unit of the type shown in FIG. 1 and described in the Ryan patent noted above is typically used for the purification of water which has been condensed from steam used in an electrical generating system powered by fossil or nuclear fuels. The water used in these systems is generally of a demineralized level, but still has impurities in the range of 50-250 parts per billion. The purification unit 10 performs the function of both filtering the water to remove undissolved solids and passing the water through a medium containing ion-exchange resins to remove dissolved solids.

The purification unit 10 includes a tank 12 having a service inlet 32 and a service outlet 34. Arranged within the tank 12 are a plurality of filter elements 20, held in alignment at their uppermost ends by a top plate 14, and supported at their lowermost ends by spring-loaded gasket arrangements (not shown) engaging bottom tube connectors 44 inserted within a downwardly convex bottom tube sheet 16. The precise manner in which the filter elements 20 are mounted in the tank 12 is unimportant as long as a tight seal is formed. Several suitable mounting arrangements are familiar to those skilled in the art. The purification unit 10 also includes a vent 36 and a manhole 38 provided in the top surface of the tank 12.

In the operation of the purification unit 10, water to be purified enters the tank 12 through the service inlet 32 and is deflected toward the filter elements 20 by the service inlet baffle 18. Water passes through the outer surface of the filter elements 20, in which removal of the desired amount of dissolved and undissolved solids is accomplished, and the water continues downwardly through the central area of the filter elements into the bottom tube connectors 44, past a service outlet baffle 19, and out a service outlet 34. The walls of the service inlet 32 are sealed to an opening in the bottom tube sheet 16, and the tube sheet 16 is firmly sealed to the tank 12, thereby providing separation of purified from unpurified water within the tank 12.

The filter elements 20 are initially precoated with a layer of ion-exchange resin particles, typically in the size range of about 60 to 400 mesh, hereinafter referred to sometimes as "finely divided" resin particles. The method of accomplishing such precoating is well known to those skilled in the art, and is described, for example, in U.S. Pat. No. 3,666,097, which is assigned to the assignee of this application. After a period of use of the purification unit 10, the filter elements reach an "exhausted" stage, ordinarily determined by an increase in pressure drop across the elements 20 above the predetermined level or by an increase in the conductivity of the effluent. At this time, a backwash cycle is used to remove the exhausted precoat layer from the filter elements 20 and also to expel it from the tank 12 so that a fresh precoat layer can be placed on the filter elements 20. To this end, as is well-known in the art, a backwash liquid is cycled through the tank 12 in the direction opposite the flow of liquid in the normal service cycle. The backwash liquid is delivered through the service outlet 34, and flows through the bottom tube connector 44 and into the center of the filter elements 20 to create a force which removes the precoat from the filter elements.

Figure 2:
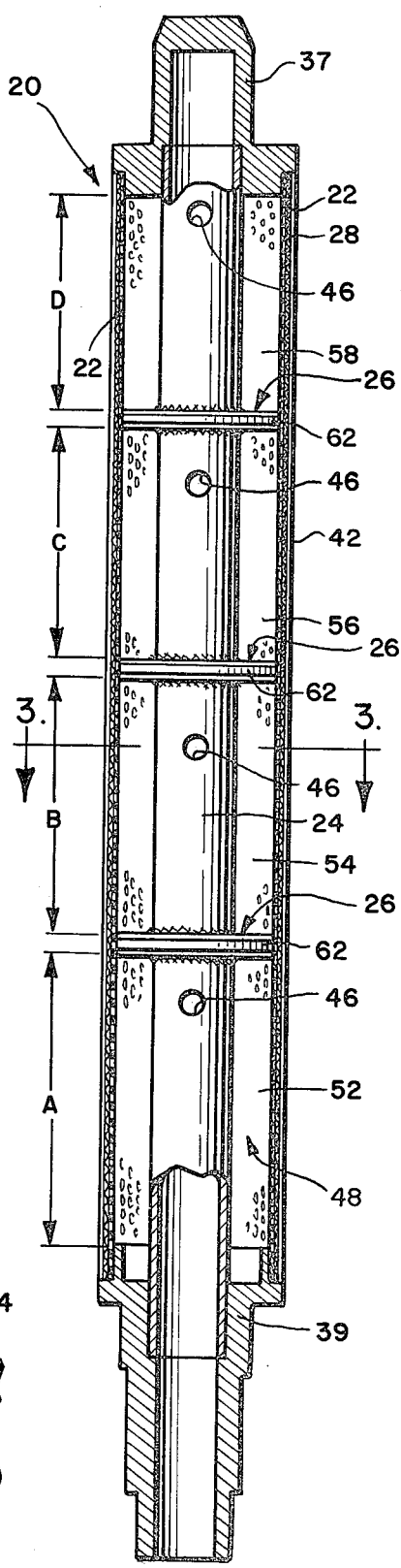
FIG. 2 is an enlarged cross-sectional view of a single tubular filter element of the present invention, illustrating the centrally located distributor core, dividers, and annular chambers of varying lengths.
Figure 3:
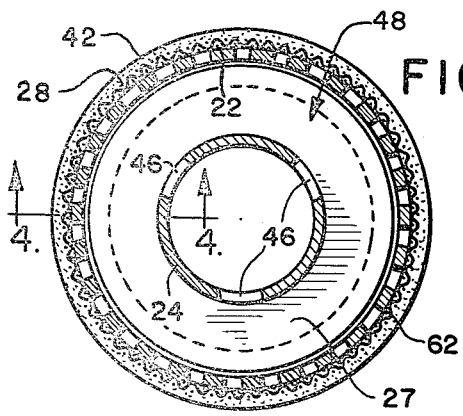
FIG. 3 is a cross-sectional top view of the tubular filter element of FIG. 2, taken along line 3—3, and illustrating the symmetrical positioning of apertures within the distributor core and the various layers of the filter element.
Figure 4:
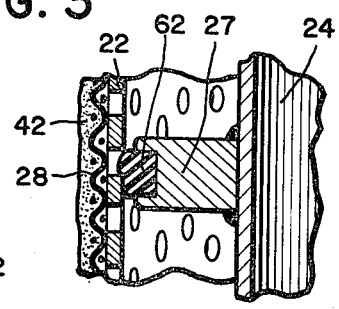
FIG. 4 is an enlarged, cross-sectional side view of the tubular filter element of FIG. 3, illustrating a portion of one of the dividers of the present invention.

According to the present invention, as illustrated in FIGS. 2, 3, and 4, there is provided a filter element 20 which operates more effectively than the apparatus of the prior art during both service and backwash cycles of the purification unit 10. As used herein, references to "top" or "upper" end and "bottom" or "lower" end of the filter element are used, respectively, to mean "away from" and "towards" the discharge end of the filter element 20 as determined in a service cycle direction. It is understood that the present invention is described for use in a filter unit 10 having a bottom tube sheet 16 as defined in the art but the scope of the invention is intended to cover filter elements designed for use in filter units having a "top tube sheet" as defined in the art.

The filter element 20, shown in FIG. 2 but not drawn to scale, includes a perforated tubular member 22 for supporting a filter medium 42. Between the support member 22 and the filter medium 42, there is typically a wire screen 28 of 50 by 250 mesh and a layer of coarse woven wire cloth (not shown). Alternatively, as is well known to those skilled in the art, a suitable filter medium retaining means may be provided by a wound filter element (not shown), constructed of a thickness suitable for the pressure drop desired across the filter element 20, and suitably wound with nylon yarn or the like for retention of the size of particles which form the filter medium. However, it has been found that flow distribution problems are generally greater in elements that do not use wound filter cartridges and hence the present invention provides particularly significant advantages to the nonwound filter elements.

Centrally disposed within the filter element 20 is a tubular distributor core 24 having a plurality of apertures 46 in the wall of the core 24. An open annular space 48 is thereby defined between the distributor core 24 and the support tube 22. The core 24 is positioned within the support tube 22 by a bottom sleeve 39 so that the fluid passageway from the bottom tube connector 44 into the filter element 10 is through the distributor core 24 and the only access into the annular space 48 is through the apertures 46 or the filter medium 42. The top end of the filter element is sealed by a top end plug 37 which is also used to position the filter element 20 within the tank 12. According to the present invention, the annular space 48 is not filled with a filter medium or other material, and therefore unimpeded distribution of liquid transversely between the distributor core 24 and the support tube 22 is accomplished.

Within the annular space 48 are positioned a plurality of ring-shaped dividers 26 which abut both the distributor core 24 and the support member 22 to form a plurality of annular chambers 52, 54, 56, and 58. The dividers 26 are attached to the central distributor core 24 or to the support tube 22 or both, so that liquid cannot flow longitudinally past the dividers 26. In the preferred embodiment as shown in FIG. 4 each ringshaped divider 26 is a metal ring 27 having a flexible sealing band 62 around its external circumference, whereby a pressure fit is provided by contact between the flexible sealing band 62 and the wall of the support tube 22. The plurality of apertures 46 are provided in the outer wall of the distributor core 24 allow passage of liquid in both the service cycle and backwash directions. In the preferred embodiment three dividers 26 are provided, creating four annular chambers. Three apertures 46 are preferably located on a common horizontal level within each chamber with three apertures 46 symmetrically positioned at each level.

According to the present invention, the ringshaped dividers 26 are located so that the ratio of flow through the apertures 46 into an annular chamber to the surface area of the support tube 22 which is served by the liquid flowing through the chamber is the same for all annular chambers. Deviation from a constant flow to area ratio for all chambers reduces the uniformity of the backwash flows at the retention screen 28 along the length of the element 20. To accomplish substantially uniform flow at the screen 28 and maintain the aperture diameters at an acceptable level to avoid plugging of the apertures 46, the chambers are of unequal size. The lowest chamber 52, which is subject to the largest flow in the filter element 20, has the largest chamber length A, whereas the uppermost chamber 58 has the smallest, indicated by reference letter D. The lengths of chambers 54 and 56 are indicated respectively in FIG. 2 by reference letters B and C. The difference in length of the chambers is chosen so that the diameter of the apertures needed to accomplish desired distribution of the backwash and service cycle liquid is not so small as to prevent problems with plugging of the apertures 46 by undissolved solids in the liquid.

Although the location of the apertures 46 in the core 24 is shown at one level and the apertures 46 are shown to be in particular vertical positions with respect to the dividers 26, the location of the apertures 46 may vary depending upon other restraints in the system. For example, the location of the apertures with respect to the dividers 26 may be chosen to be at any suitable position, as long as provision is made for the venting of air from the central core 24 by means of an aperture 46 at or near the top of the uppermost chamber 58. For instance, the apertures 46 can be located midway between the dividers 26 to enhance uniform flow through the area of the filter medium retaining screen 28 served by each set of apertures 46. Alternately, the apertures 46 may be located just above the divider 26 in each chamber so that any particles passing through the filter medium retaining screen 28 can be removed in the service flow direction from the annular chambers through the apertures 46. The apertures 46 could be located at several elevations within a chamber to achieve a combination of advantages of flow distribution and removal of undissolved particles from the annular chambers.

In a modification of the preferred embodiment, the diameter of the apertures 46 is changed along the vertical dimension of the filter element 20 so that the pressure drop across the wall of the distributor core 24 progressively decreases as the pressure drops are sampled from the lowermost chamber 52 to the uppermost chamber 58. To this end, the apertures 46 near the bottom tube sheet 16 are smaller in diameter than those further away from the bottom tube sheet 16. If the aperture diameters are changed, however, they should preferably be varied so that the desired ratio of flow rate to filter precoat area is maintained, i.e., the ratio of the flow of liquid through the apertures 46 into an annular chamber to the area of the support tube 22 served by the annular chamber is the same for all chambers. The distances between the dividers 26 vary and are chosen in conjunction with the aperture diameters so that the ratio described above is maintained. Determination of the flow rates may be by any suitable method such as physical measurement of the pressure drops along the length of the filter element and correlation of pressure drops to flow rates by means of a constant dependent upon resistance to flow through the element. The pressure drop across the support tube 22, for instance, may be measured at each of various levels by inserting a hypodermic needle through the support tube 22 and fitting a manometer pressure line to the needle.

The following example is presented for purposes of clarification of the invention and is not meant to limit the invention to the embodiment discussed therein; the scope of the invention is intended to be determined by reference to the appended claims.

EXAMPLE

Particular dimensions and flows have been calculated for a filter element 20 having a support tube 22 with an outside diameter of two inches and a length of 72 inches. The diameter of the central distributor core 24 was one inch. Three dividers 26 were positioned along the length of the filter element 20 to divide the element into four chambers of varying length. To simplify calculations, three apertures 46 were arranged at the same level within each chamber, each at a position 120° with respect to the nearest aperture. The apertures 46 were also located at uniformly spaced vertical distances along the element, 1.5 feet apart, so that only one set of holes served each chamber.

It was determined that in order to provide apertures 46 of sufficient diameter to reduce the possibilities of plugging of the apertures 46 by lodging of undissolved particles within the apertures 46, a suitable ratio of flow of liquid through the apertures 46 in the bottom chamber 52 to flow of liquid through apertures in the top chamber 58 is about 1.6 to 1. With this flow ratio, and a 72-inch filter element, the lengths of the chambers were as follows: A is 1.86 feet, B is 1.60 feet, C is 1.37 feet, and D is 1.17 feet. The aperture size calculated for this arrangement is about 0.35 inches. At a total flow rate to the filter element 20 of 0.5 ft.$^3$/min. per ft.$^2$ of surface of support tube 22, the ratio of flow rate of liquid through the aperture into the annular chamber to the surface area of the support tube 22 served by the apertures was approximately 0.26 for each chamber. Flow rates into the chambers varied from about 0.49 ft.$^3$/min. at the lowermost chamber 52 to 0.3 ft.$^3$/min. at the uppermost chamber 58.

Though the filter element 20 of the present invention has been discussed in relation to a precoat layer 42 of finely divided ion-exchange resin particles, the filter element 20 including the distributor core 24 is likewise applicable where the precoat layer is regenerated cellulose, diatomaceous earth, or any other type of precoat material, as will be understood by one with ordinary skill in the art. Also, the filter element has been described as positioned vertically in a filter unit having a bottom tube sheet 16. One of ordinary skill in the art could modify the preferred embodiment for use with a top tube sheet in accordance with the definitions of the terms "top" or "upper" and "bottom" or "lower" set forth herein and used to describe ends of the filter element 20. Furthermore, though the embodiment hereinbefore described is preferred, many other modifications and refinements which do not depart from the true spirit and scope of the invention may be conceived by those of ordinary skill in the art. It is intended that all such modifications and refinements be covered by the following claims.

I claim:

1. In a filter unit for purifying liquid, having a filter tank, an inlet for passing liquid to be purified into the filter tank, an outlet for removing purified liquid from the filter tank, and a means for precoating filter elements within the tank with a precoat of particles of a filter medium, at least one improved tubular filter element positioned within the tank so that liquid to be purified enters the outer area of the filter element during a service cycle and passes longitudinally through the filter element to a discharge end of the filter element, comprising:

a perforated tubular support member for supporting the precoat of filter medium particles;

a tubular distributor core, concentrically located within said support member to define an annular space between said support member and said distributor core, having a plurality of apertures in the wall of said distributor core; and a plurality of dividers positioned axially along said distributor core within said annular space to prevent the unimpeded flow of liquid through said annular space, said dividers defining a plurality of annular chambers within said annular space, said annular chambers decreasing in length in a direction away from the service cycle discharge end of the filter element.

2. In a filter unit for purifying liquid, having a filter tank, an inlet for passing liquid to be purified into the filter tank, an outlet for removing purified liquid from the filter tank, and a means for precoating filter elements within the tank with a precoat including ion exchange resin particles in the size range of 60 to 400 mesh, at least one improved tubular filter element having a service cycle discharge end and positioned within the tank so that liquid to be purified enters the outer area of the filter element and passes longitudinally through the filter element to the discharge end of the filter element, comprising:

a perforated tubular support member for supporting the filter medium precoat;

a tubular distributor core, concentrically located within said support member to define an annular space between said support member and said distributor core, having a plurality of apertures in the wall of said distributor core; and a plurality of dividers positioned axially along said distributor core within said annular space to prevent the unimpeded flow of liquid through said annular space, said dividers defining a plurality of annular chambers within said annular space, said annular chambers decreasing in length in a direction away from the service cycle discharge end of the filter element.

3. The apparatus of claims 1 or 2 wherein the diameter of the apertures in the tubular distributor core increases in size along the longitudinal axis of the filter element in a direction away from the discharge end of the element.

4. In a filter unit for purifying liquid, having a filter tank, an inlet for passing liquid to be purified into the filter tank, an outlet for removing purified liquid from the filter tank, and a means for precoating filter elements within the tank with a precoat of particles of a filter medium, at least one tubular filter element positioned within the tank so that liquid to be purified enters the outer area of the filter element during a service cycle and passes longitudinally through the filter element to a discharge end of the filter element, comprising:

a perforated tubular support member for supporting the filter medium particles;

a tubular distributor core, concentrically located within said support member to define an annular space between said support member and said distributor core, having a plurality of apertures in the wall of said distributor core; and means positioned axially along said distributor core within said annular space for preventing the unimpeded flow of liquid longitudinally through said annular space and for defining a plurality of annular chambers within said annular space, said annular chambers decreasing in length in a direction away from the service cycle discharge end of the filter element, the length of the annular chamber adjacent the discharge end being approximately 1.6 times the length of the annular chamber furthest away from the discharge end.

5. The apparatus of claims 1, 2 or 4 wherein the diameter of the tubular support member is approximately twice the diameter of the tubular distributor core.

6. The apparatus of claims 1, 2 or 4 wherein four annular chambers are provided.

7. The apparatus of claim 6 wherein the ratios of the length of each annular chamber to the length of the annular chamber closest to the discharge end are, in a direction away from the discharge end, approximately 1.17, 1.37, and 1.6 respectively.

8. A method of improving distribution of liquid throughout the length of a filter element in a filter unit for purifying liquid, said filter unit including a filter tank, an inlet and outlet for the filter tank, and a means for precoating filter elements within the tank with a precoat of particles of a filter medium, said filter element having a service cycle discharge end, a perforated tubular support member for supporting the filter medium particles, and a tubular distributor core, concentrically located within the support member to define an annular space between the support member and the tubular distributor core, having a plurality of apertures in the wall of the distributor core, comprising:

positioning a plurality of dividers along the distributor core within the annular space, said dividers defining a plurality of annular chambers within said annular space, said dividers so positioned that the annular chambers decrease in length in a direction away from the service cycle discharge end of the filter element in order to more uniformly distribute the flow of liquid along the length of the filter element at the perforated tubular support member.

9. The method of claim 8 further comprising the step of increasing the diameter of the apertures along the longitudinal axis of the filter element in a direction away from the service cycle discharge end of the element.

10. The method of claim 8 wherein the length of the annular chamber adjacent the discharge end is approximately 1.6 times the length of the annular chamber adjacent the discharge end.

* * * * *

UNITED STATES PATENT AND TRADEMARK OFFICE
CERTIFICATE OF CORRECTION

PATENT NO. : 4,267,039
DATED : May 12, 1981
INVENTOR(S) : Leo F. Ryan

It is certified that error appears in the above-identified patent and that said Letters Patent are hereby corrected as shown below:

Column 1, line 55, delete "passages" and substitute therefor --passage--;

Column 5, line 6, delete "above the" and substitute therefor --above a--;

Column 6, line 8, delete "ringshaped" and substitute therefor --ring-shaped--;

Column 6, line 14, delete "allow" and substitute therefor --allowing--;

Column 6, line 19, insert a comma after --chamber--;

Column 6, line 21, delete "ringshaped" and substitute therefor --ring-shaped--;

Column 8, line 48, insert a hyphen after --ion--;

Column 8, line 65, delete "umimpeded" and substitute therefor --unimpeded--.

Signed and Sealed this

Twenty-seventh Day of October 1981

[SEAL]

Attest:

Attesting Officer

GERALD J. MOSSINGHOFF

Commissioner of Patents and Trademarks